US005126924A

United States Patent [19]

Watanabe

[11] Patent Number: 5,126,924

[45] Date of Patent: Jun. 30, 1992

[54] MOTOR VEHICLE HEADLAMP

[75] Inventor: Shinji Watanabe, Shizuoka, Japan

[73] Assignee: Koito Manufacturing Co., Ltd., Tokyo, Japan

[21] Appl. No.: 745,307

[22] Filed: Aug. 15, 1991

[30] Foreign Application Priority Data

Aug. 17, 1990 [JP] Japan ................................ 2-215723

[51] Int. Cl.[5] ............................................ B60Q 1/04

[52] U.S. Cl. ...................................... 362/61; 362/268; 362/310; 362/304; 362/346

[58] Field of Search .................. 362/61, 80, 268, 307, 362/310, 304, 346

[56] References Cited

U.S. PATENT DOCUMENTS 4,727,458 2/1988 Droste et al. ........................ 362/61
4,839,785 6/1989 Ohishi .............................. 362/61 X

*Primary Examiner*—Stephen F. Husar

*Attorney, Agent, or Firm*—Sughrue, Mion, Zinn, Macpeak & Seas

[57] ABSTRACT

A projector type headlamp in which an extension is firmly and positively installed without the use of adhesive. The headlamp includes a lamp body, a front lens covering the front opening of the lamp body, an elliptical mirror arranged inside the lamp body, a light bulb disposed at the first focal point of the elliptical mirror, a condenser lens whose focal point is set substantially at the second focal point of the elliptical mirror, and an extension placed around the condenser lens. The extension includes an elastic engaging piece and a plurality of screw mounting pieces. The elastic engaging piece is fixedly engaged with an engaging member formed in the inner surface of the lamp body, and the screw mounting pieces are fixedly secured to fixing portions formed in the inner surface of the lamp body with screws.

15 Claims, 6 Drawing Sheets

MOTOR VEHICLE HEADLAMP

BACKGROUND OF THE INVENTION

The present invention relates to headlamps for motor vehicle use, and more particularly to a projector type headlamp for a motor vehicle in which the output light beam of a light source is converted into a parallel light beam by means of an elliptical mirror and a condenser lens so as to illuminate the area in front of the motor vehicle.

In a projector type headlamp an elliptical mirror is arranged in a lamp chamber defined by a lamp body and a front lens covering the front opening of the lamp body, and a light bulb is installed at the first focal point of the elliptical mirror. A condenser lens is disposed in such a manner that its focal point is substantially at the second focal point of the elliptical mirror. The rays of light from the light bulb are reflected by the elliptical mirror, and gathered in a narrow space around the optical axis by the condenser lens into parallel rays of light. The condenser lens is a convex lens whose front surface is a convex surface such as a paraboloidal. An extension is provided around the condenser lens, thus closing the space between the condenser lens and the front peripheral portion of the lamp body. The projector type headlamp is advantageous in that it is small in size and a desired distribution of light can be obtained.

FIG. 10 is a sectional view showing essential components of an example of a conventional extension-mounted structure (see, for instance, U.S. Pat. No. 4,727,458). In FIG. 10, reference numeral 1 designates a vehicle body; 2, a lamp body mounted on the vehicle body 1; 3, a front lens covering the front opening 4 of the lamp body 2; 5, an elliptical mirror; 6, a condenser lens; and 7, an extension. The extension 7 is fixedly installed in the lamp by fixedly bonding the peripheral portion of the extension 7 to the flange-like front end portion of the lamp body 2 with an adhesive or the like, and the peripheral wall of the front lens 3 is fixedly fitted in the front end portion of the lamp body 2 with the extension 7 held between the flange-like front end portion of the lamp body 2 and the end face of the peripheral wall of the front lens 3.

However, the above-described conventional extension mounting structure suffers from the certain difficulties. First, surface alignment of the lamp body 2 and the front lens 3 is difficult. Furthermore, it is rather difficult to rigidly couple the front lens 3 to the lamp body 2. That is, in the application of the adhesive, the lamp body 2 may be made fouled thereby unless the operator is very careful. Also, the adhesive tends to deteriorates with time, so that the extension 7 may come off the lamp body 2.

SUMMARY OF THE INVENTION

Accordingly, an object of the invention is to eliminate the above-described difficulties accompanying a conventional motor vehicle headlamp. More specifically, an object of the invention is to provide a motor vehicle headlamp of the above-described type in which the extension is firmly and positively installed without the use of adhesive.

The foregoing and other objects of the invention have been achieved by the provision of a motor vehicle headlamp comprising: a lamp body, a front lens covering the front opening of the lamp body, an elliptical mirror arranged inside the lamp body, a light bulb disposed at the first focal point of the elliptical mirror, and a condenser lens whose focal point is set substantially at the second focal point of the elliptical mirror, and an extension placed around the condenser lens, in which, according to the invention, the extension has an elastic engaging piece and screw mounting pieces, the elastic engaging piece is fixedly engaged with an engaging member formed in the inner surface of the lamp body, and the screw mounting pieces are fixedly secured to fixing portions formed in the inner surface of the lamp body with screws.

In the motor vehicle headlamp according to the invention, the elastic engaging piece of the extension is engaged with the engaging member formed in the inner surface of the lamp body while the screw mounting pieces of the extension are secured to the fixing portions formed in the inner surface of the lamp body, whereby the extension is fixedly secured to the lamp body.

BRIEF DESCRIPTION OF THE DRAWINGS

FIG. 2(*b*) is a bottom perspective view, with parts cut away, showing the engagement of an alternate arrangement of the engaging piece and engaging member;

DESCRIPTION OF THE PREFERRED EMBODIMENTS

A preferred embodiment of the invention will be described with reference to the accompanying drawings.

Figure 3:
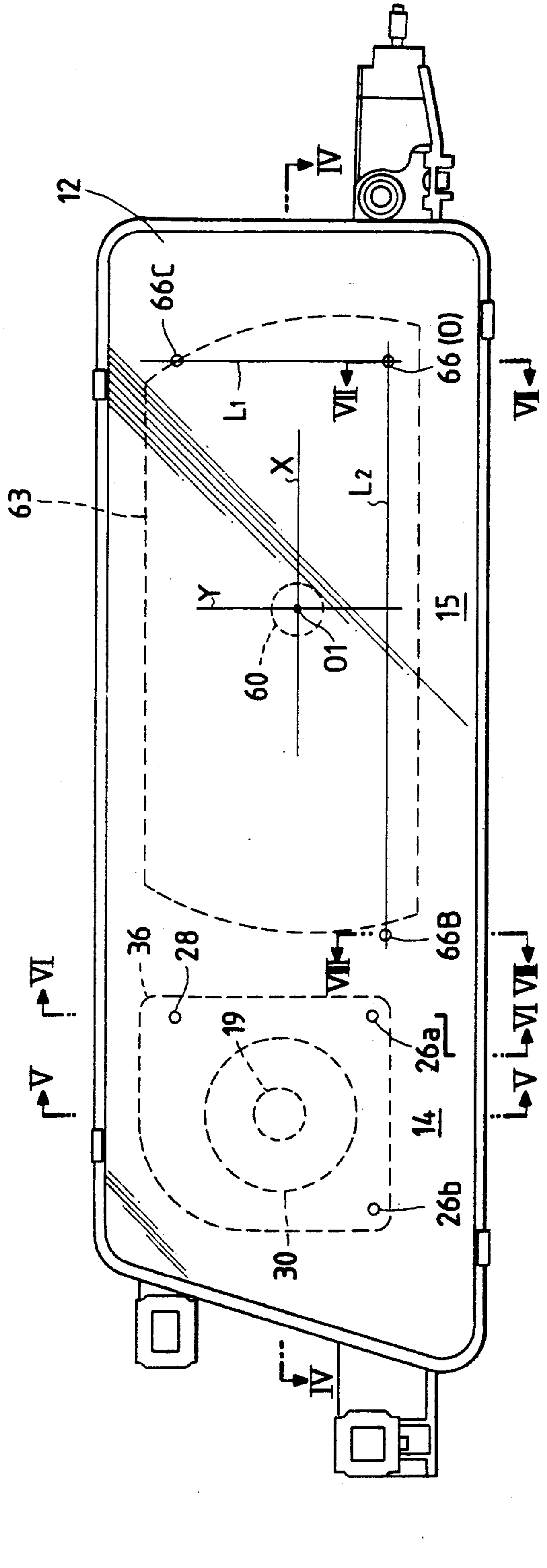
FIG. 3 is a front view of the motor vehicle lamp.
Figure 4:
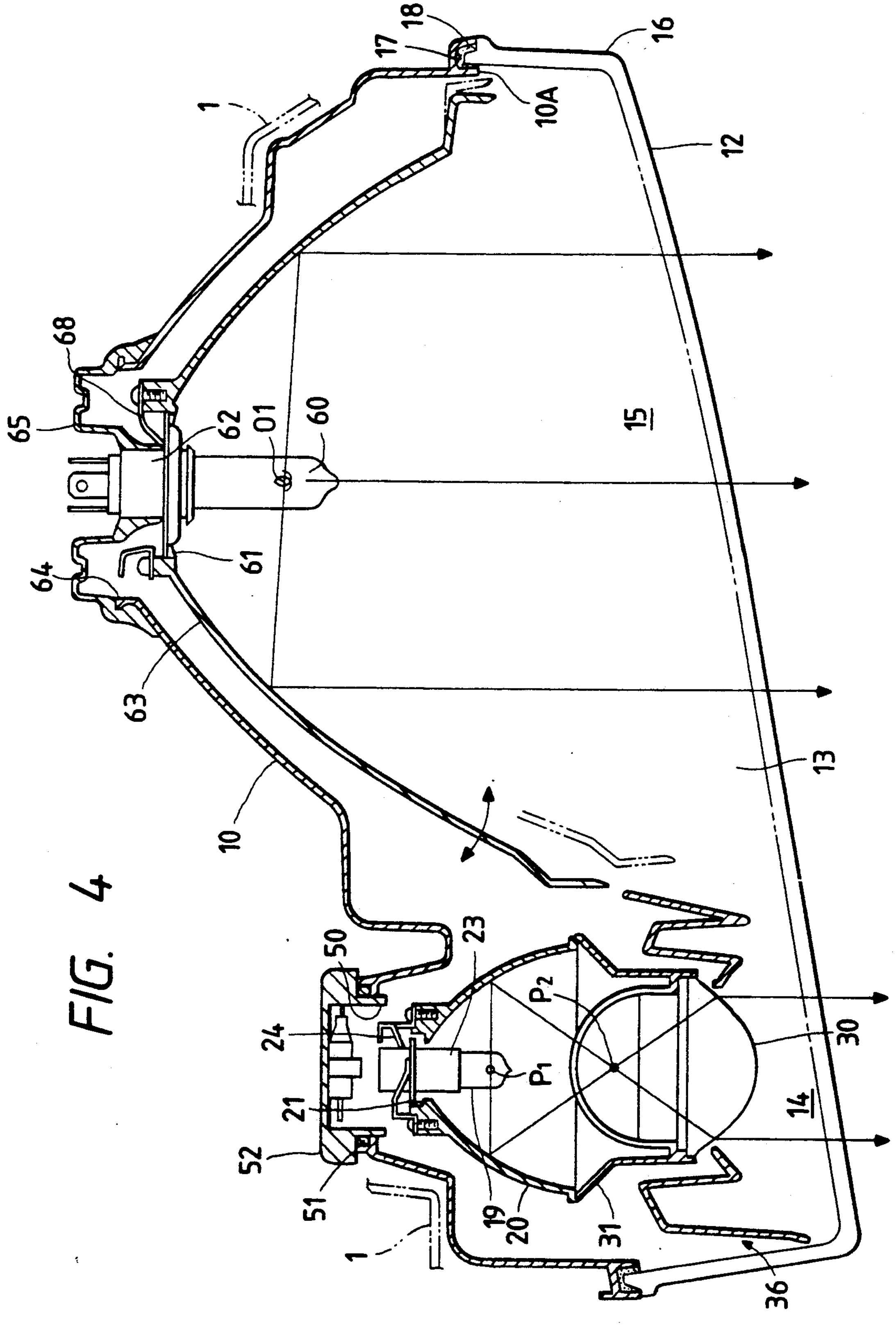
FIG. 4 is a sectional view taken along line IV—IV in FIG. 3.

FIGS. 3 and 4 show a vehicular headlamp located on the left-hand side as viewed from the driver's seat. In these figures, a lamp body 10 mounted on a vehicle body 1, and a front lens closing the front end opening 10A of the lamp body 10 hermetically form a lamp chamber 13, in which a fog lamp unit 14 and a headlamp unit 15 are provided.

The front lens 12 is a clear lens which is curved substantially according to the curvature of the adjacent panel of the vehicle body. Therefore, in the front end as viewed from the driver's seat, the left end is set back from the right end. The front lens 12 has a lens fixing portion 16 which extends rearward from its periphery. The lens fixing portion 16 is fixedly engaged with an adhesive in a forwardly opening annular groove 17 formed in the front opening 10A of the lamp body. In addition, the lens fixing portion 16 is secured to the lamp body 10 with C-shaped plate springs (not shown).

Figure 5:
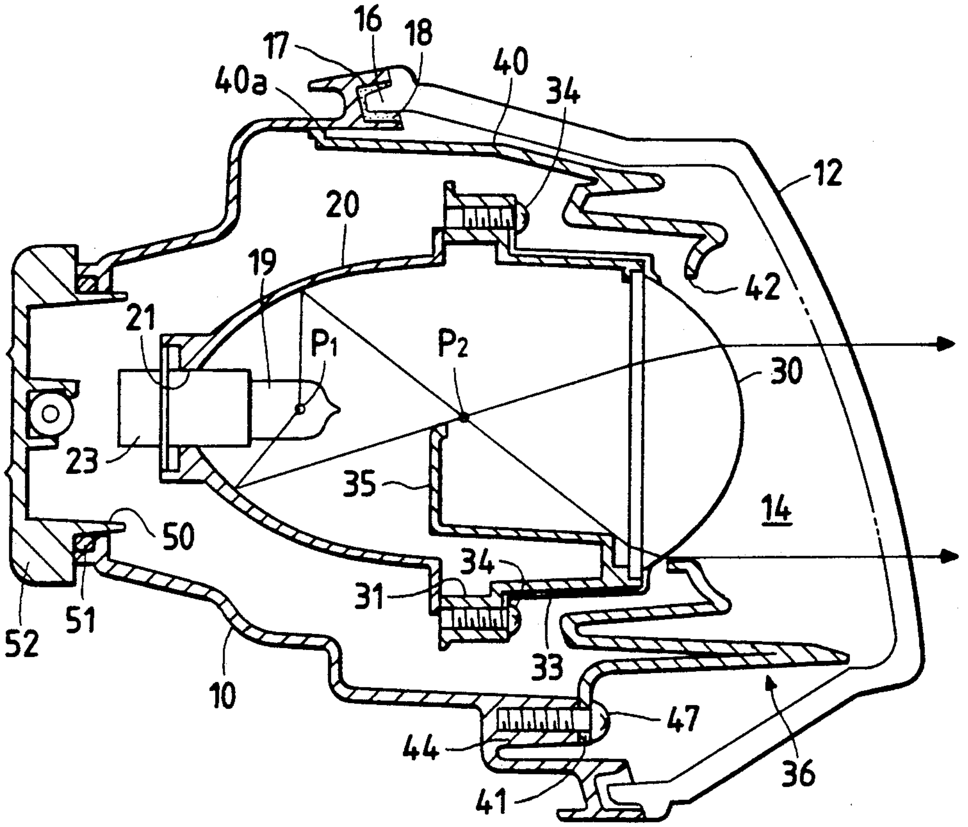
FIG. 5 is a sectional view taken along line V—V in FIG. 3.
Figure 6:
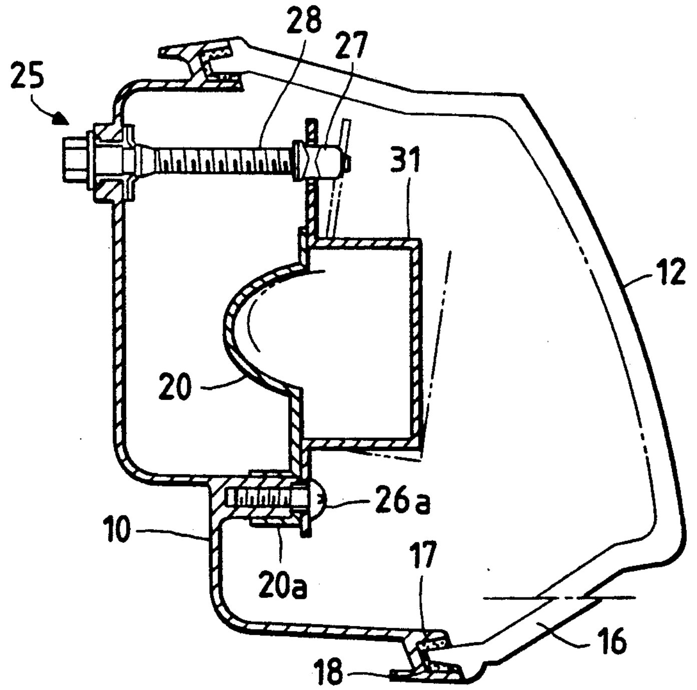
FIG. 6 is a sectional view taken along line VI—VI in FIG. 3.

The fog lamp unit 14, as shown in FIGS. 4 and 5, includes a light bulb 19 and an elliptical mirror 20 mounted inside the lamp body 10 at the right end. The inner surface of the elliptical mirror 20, shaped as an ellipsoidal surface of revolution, is formed by vacuum deposition of aluminum. The light bulb 19 is inserted into the elliptical mirror 20 through a bulb inserting hole formed in the rear end portion of the mirror 20 with its base locked to the rear portion. More specifically, the base 23 has a flange, which, when the light bulb is inserted into the mirror, is pushed against the edge of the bulb insertion hole by a set spring 24 which is rotatably engaged at one end with the rear end portion of the elliptical mirror 20. The filament of the light bulb 19 is set at the first focal point $P_1$ of the elliptical mirror 20. The elliptical mirror 20 is designed so that its angular position can be adjusted with an aiming mechanism 25 as shown in FIG. 6; that is, the mirror can be swung vertically with the mechanism 25. The aiming mechanism 25 is composed of a pair of right and left fixing screws 26*a* and 26*b* (FIG. 3) for securing to the lamp body 10 an elastically deformable fixing portion 20*a* which is provided below the rear end portion of the elliptical mirror 20, a self-locking nut 27 provided above the rear end portion of the elliptical mirror 20, and an adjusting screw 28 which rotatably penetrates the lamp body 10 with its front en portion engaged with the self-locking nut 27. As the adjusting screw 28 is turned, the self-locking nut is moved on the adjusting screw 28 back and forth, so that the elliptical mirror 20 is swung vertically, whereby the angle of irradiation of the fog lamp bulb 19 is adjusted.

As shown in FIGS. 4 and 5, a yellow condenser lens 30 is coupled through a holder 31 to the front opening of the elliptical mirror 20.

The condenser lens 30 has a front surface which is a convex surface such as a paraboloidal surface, and a rear surface which is flat. The condenser lens 30 is positioned so that its focal point is substantially at the same position as the second focal point of the elliptical mirror 20. Therefore, the rays of light emitted from the light bulb 19, being reflected from the elliptical mirror 20, are concentrated at the second focal point $P_2$, and then gathered in a narrow space around the optical axis by the condenser lens 30, so that they are projected, as parallel rays of light, to the area in front of the vehicle body.

The holder 31 is cylindrical in configuration. The condenser lens 30 is secured to the holder 31 by securing a mounting metal part 33 provided on the cylindrical outer wall of the holder 30 to the holder 31 with fixing screws 34 so that the peripheral portion of the condenser lens 30 is secured to the front end of the holder 31. A shade 35 is provided inside the holder 31 so as to block a part of the output light beam of the light bulb 19, that is, to provide a light distribution pattern which has cut lines as desired. An extension 36 is provided in front of the holder 31.

The extension 36 is provided to cover the space between the condenser lens 30 and the lamp body 10 and the space between the front lens 12 and the reflector of the headlamp unit 15 (described later), thereby to improve the external appearance of the headlamp as viewed from the front of the vehicle and to protect the components around the condenser lens 30 from the heat of the lens 30. The extension 36 is formed by two parts made of synthetic resin, namely, an extension body 36A, which has a rectangular front opening and a circular hole 37 in its rear end portion at the center, and a cylindrical member 36B, which is inserted into the circular hole 37 from the rear and secured to the extension body 36A with screws 38.

More specifically, the extension body 36A is composed of an upper plate $A_1$, a lower plate $A_2$, a pair of right and left side plates $A_3$ and $A_4$, and a rear plate $A_5$ which is curved forwardly and has the aforementioned circular hole 37 at the center. In the right and left headlamps, the extension bodies are asymmetric with each other. In the extension body 36A, an elastic engaging piece 40 extends rearward from the middle of the upper plate $A_1$, and a pair of right and left screw mounting pieces 41 extend downward from the lower plate $A_2$. The rear end portion of the elastic engaging piece 40 is formed into an locking portion 40*a* which is bent so as to be L-shaped in section.

The cylindrical member 36B includes a conical body $B_1$ whose front opening smaller in diameter than its rear opening, and a conical cover portion $B_2$ for covering the peripheral portion of the lens 30. The cover portion $B_2$ is formed by extending the edge of the front opening radially inwardly in such a manner as to form the lens inserting hole 42. In the right and left headlamps, the cylindrical members 36 are symmetrical with each other. The rear opening of the body $B_1$ has an inside diameter large enough to be fitted on the front end portion of the cylindrical holder 31 (FIGS. 4 and 5).

The extension 36 is of split type, being made up of two parts, as described above. This configuration is advantageous over an extension of the integral type which must be formed separately for the right and left headlamps, in that the cylindrical members 36B for the right and left head lamps can be manufactured as a common component although the extension bodies 36A for the right and left headlamps must be manufactured respectively. Furthermore, in the case of the extension of the split type, the required mold can be formed with ease, and an aluminum layer can be uniformly formed on the entire inner surface of the extension 36 by vacuum deposition. The extension of a split type has been described. However, the invention is not limited thereto or thereby. That is, an extension of the integral type as shown in FIG. 9 can be employed.

Figure 1:
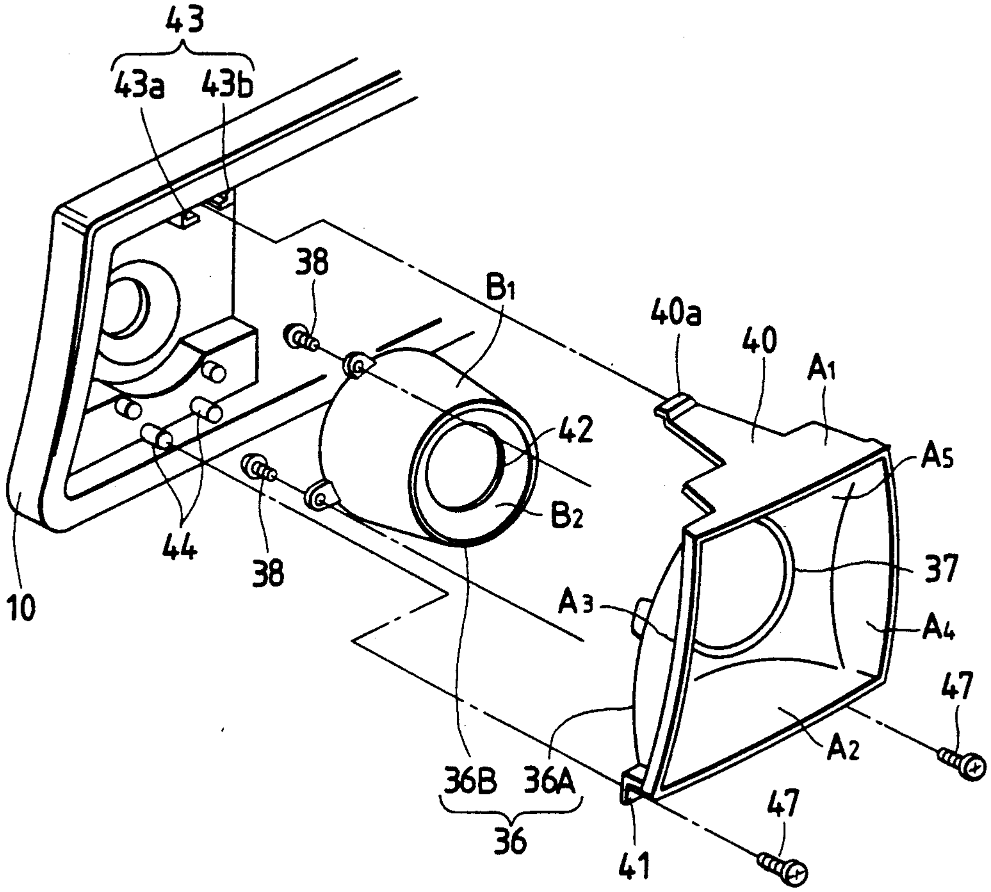
FIG. 1 is an exploded perspective view showing an extension in an example of a motor vehicle headlamp according to the invention.
Figure 9:
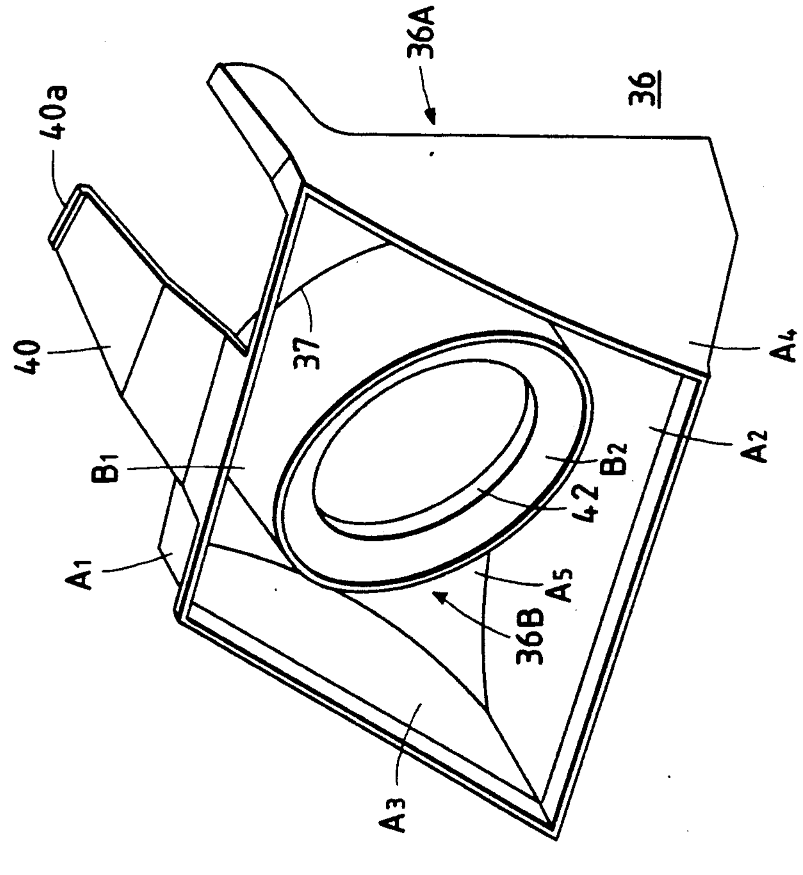
FIG. 9 is a perspective view showing an extension of the integral type according to the invention.

In FIG. 9, parts corresponding functionally to those of the extension 36 shown in FIG. 1 are designated by the same reference numerals or characters.

Figure 2A:
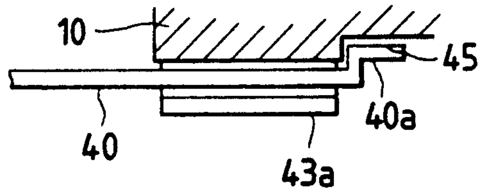
FIG. 2(*a*) is a sectional view showing the engagement of an elastic engaging piece and an engaging member.
Figure 2B:
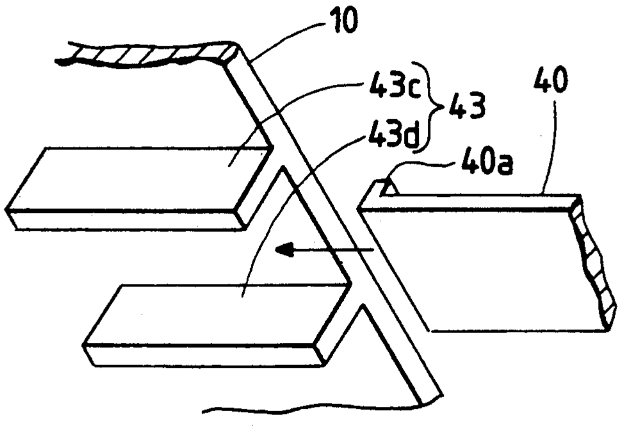

Inside the lamp body 10, an engaging member 43 (FIGS. 1 and 2(*a*)) is provided for the elastic engaging piece 40 of the extension body 36A, and fixing portions 44 (FIGS. 1 and 5) are provided for the screw mounting pieces 41, and a locking recess 45 (FIG. 2(*a*)) is provided for the locking portion 40*a* of the elastic engaging piece 40. The engaging member 43 is formed on the inner surface of the upper wall of the lamp body 10. More specifically, the engaging member 43 is formed of a pair of right and left bent pieces 43*a* and 43*b* L-shaped in section which are formed on the inner surface of the upper wall of the lamp body in such a manner as to confront each other. The fixing portions 44 are provided on the inner surface of the lower wall of the lamp body 10 in such a manner that they extend towards the front of the vehicle body. The fixing portions 44 have screw holes formed in their front end portions. The locking recess 45 is formed in the inner surface of the upper wall of the lamp body 10 immediately behind the engaging member 43.

The extension 36 can be readily mounted by inserting the elastic engaging piece 40 in the space between the pair of bent pieces 43*a* and 43*b* from the front of the vehicle body until the locking portion 40*a* is engaged with the locking recess 45 under pressure, as a result of which the screw mounting pieces 41 are abutted against the fixing portions 44. Under this condition, the screw mounting pieces 41 are fixedly secured to the fixing portions 44 with screws 47. It is evident that the extension 36 can be removed with ease.

The engaging member 43 alternately may be formed by a pair of right and left plates 43*c* and 43*d*, as shown in FIG. 2(*b*). In this case, the elastic engaging piece 40 is inserted into the space between the plates 43*c* and 43*d* until the locking portion 40*a* is fixedly pushed against the inner surface of the upper wall of the lamp body 10. In the above-described embodiment, the locking portion 40*a* is L-shaped in section; however, it may be a part of the elastic engaging piece which is bent upwards as shown in FIG. 2(*b*).

A bulb inserting hole 50 is formed in the rear wall of the lamp body 10 in correspondence with the position of the fog lamp unit 14 (FIGS. 4 and 5). The bulb inserting hole 50 thus formed is hermetically closed with a back cover 52 through an O-ring 51.

The headlamp unit 15, as shown in FIGS. 3, 4, 7 and 8, includes a light bulb 60, a reflector 63 having a bulb inserting hole 61 in its rear end portion through which the light bulb 60 is inserted from the rear with the aid of its base 62, a socket cover 65 made of an elastic material such as rubber which hermetically closes the bulb inserting hole 64 with its central hole engaged tightly with the outer cylindrical wall of the rear end portion of the light bulb base 62 and with its peripheral portion engaged tightly with the peripheral portion of a bulb inserting hole. 64 formed in the left end portion of the rear wall of the lamp body 10, and an aiming mechanism 66 for the reflector 63.

The light bulb 60 for the headlamp unit is a halogen lamp which has a filament (not shown) for forming a low light beam and a separate filament (not shown) for forming a high light beam.

The light bulb base 62 is fitted in the bulb inserting hole 61 formed in the reflector and is fixedly secured with a leaf spring 68, one end portion of which is rotatably mounted on the rear end portion of the reflector 63.

The reflector 63 has a front opening which is substantially rectangular, and a rear wall whose inner surface is in the form of a paraboloid of revolution. The inner surface is made into a reflecting surface with an aluminum layer formed thereon by vacuum deposition. The aiming mechanism 66 is operated to swing the reflector 63 horizontally and vertically, thereby to adjust the inclination of the optical axis, that is, the angle of irradiation of the lamp.

The aiming mechanism 66 includes one swing fulcrum mechanism 66A (FIG. 7) and two aiming mechanism units 66B (FIG. 8) and 66C which supports the reflector 63 at three points.

Figure 7:
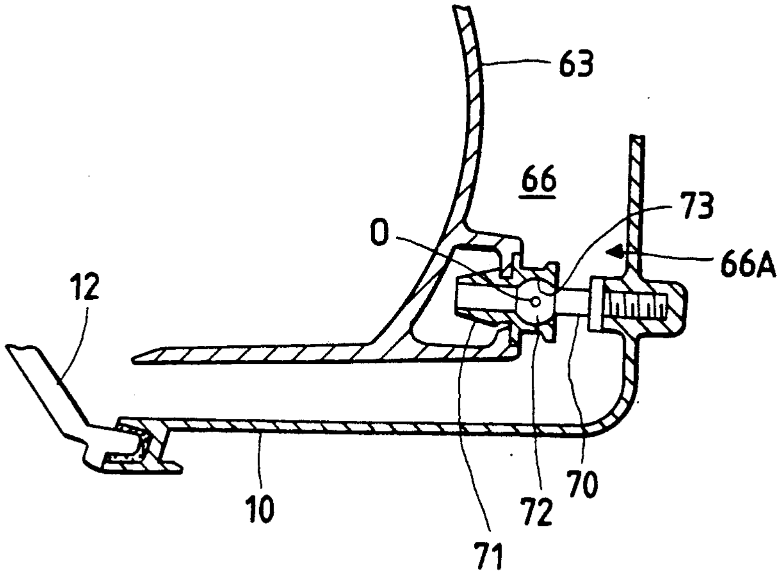
FIG. 7 is a sectional view taken along line VII—VII in FIG. 3.

The swing fulcrum mechanism 66A, which allows for adjustment in the horizontal direction, as shown in FIG. 7, includes a swing fulcrum shaft 70 embedded in the lower right-hand end portion of the rear wall of the lamp body 10, and a bag-shaped bearing 71 fitted in the lower right-hand end portion of the rear wall of the reflector 63. The end portion of the swing fulcrum shaft 70 is formed into a spherical head, which is slidably engaged with the spherical seat 73 of the bag-shaped bearing 71. The center 0 of the spherical head 72 is the center of swing of the reflector 63. The swing fulcrum shaft 70 is provided at a position at predetermined distances from the horizontal axis (optical axis horizontal line) X and a vertical axis (optical axis vertical line) Y which pass through the center 0: (FIG. 3) of the light bulb 60 when measured downward toward the right.

The aiming mechanism unit 66B is positioned so that it is substantially symmetrical in position to the swing fulcrum shaft 66A with respect to the vertical axis Y intersecting the center $O_1$ of the light bulb 60. Hence, with the aiming mechanism unit 66B, the reflector 63 can be swung horizontally; that is, the angle of irradiation in the horizontal plane can be adjusted.

Figure 8:
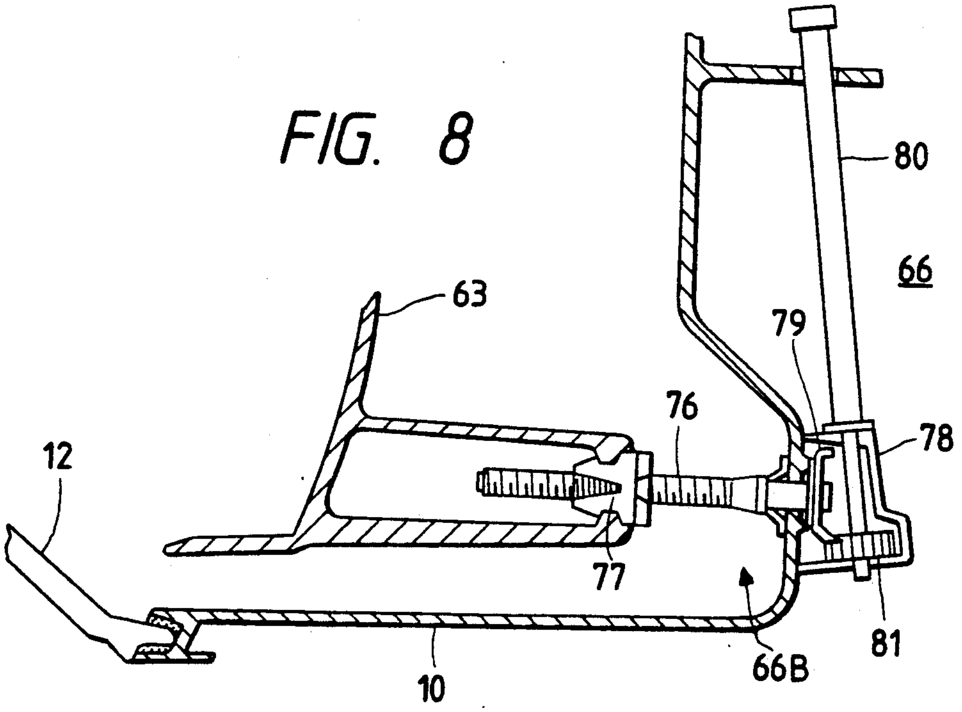
FIG. 8 is a sectional view taken along line VIII—VIII in FIG. 3.
Figure 10:
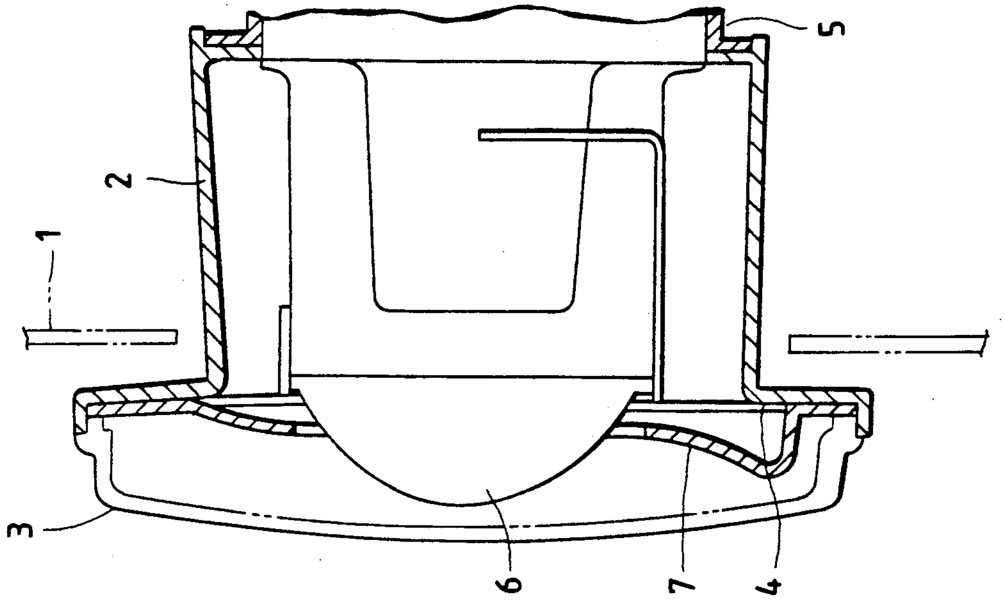
FIG. 10 is a sectional view showing essential components of an example of a conventional extension-mounted structure.

The construction of the aiming mechanism unit 66B, which allows for adjustment in the vertical direction, will be described with reference to FIG. 8 in more detail. The aiming mechanism unit 66B has an aiming screw 76 held substantially horizontally. More specifically, the aiming screw 76 is coupled to the lamp body 10 in such a manner that it is rotatable and it is limited in axial movement., and such that it extends in a front-to-rear direction. The front end portion of the aiming screw 76 is threadedly engaged with the threaded hole of a self-locking nut 77 mounted on the lower portion of the rear wall of the reflector 63. The rear end portion of the aiming screw 76 is inserted into a gear box 78 mounted on the rear wall of the lamp body 10, and is there connected to a crown gear 79. The gear box 78 includes a rod 80 held substantially perpendicular to the aiming screw 76, and a gear 81 mounted on the lower end portion of the rod 80, the gear 81 being engaged with the crown gear 79 of the aiming screw 76. The rod 80 extends upward along the rear wall of the lamp body 10. When the rod 80 is turned with a suitable tool engaged with its upper end portion, the rotation is transmitted through the gear 81 and the crown gear 79 to the aiming screw 76. Since the aiming screw 76 is allowed only to rotate, the selflocking nut 77 is moved along the aiming screw 76, whereby the reflector 63 is horizontally swung about the line $L_1$ (FIG. 3) connecting the above-described swing center O (FIG. 7) and the other aiming mechanism unit 66C as indicated by the two-dot chain lines in FIG. 4, thereby to adjust the angle of irradiation in the horizontal plane.

The rod 80 can be turned from above, which eliminates the difficulty of the operator having to insert his or her hand into the space behind the rear wall of the lamp body 10 and fumble for the aiming screw 76. Thus, the adjustment can be achieved with ease.

The other aiming mechanism unit 66C is set at a position located upward and toward the right of the horizontal axis X and the vertical axis Y which intersect the center $O_1$ of the light bulb 60, and which position is symmetrical with the position of the swing fulcrum mechanism 66A with respect to the horizontal axis X. Hence, with the aiming mechanism unit 66C, the reflector can be swung vertically about the line $L_2$ (FIG. 3) connecting the swing center O and the above-described aiming mechanism unit 66B for horizontal adjustment; that is, the angle of irradiation in the vertical plane can be adjusted.

As is apparent from the above description, the aiming mechanism unit 66C is positioned directly above the swing fulcrum mechanism 66A. The rod of the aiming mechanism unit 66C is different in length from the rod of the aiming mechanism unit 66B because the former is different in mounting position from the latter. The other arrangement of the aiming mechanism unit 66C is substantially the same as that of the aiming mechanism unit 66B. It goes without saying that the aiming mechanism unit 66C can be also operated from above the lamp body 10.

In the headlamp thus constructed, the extension 36 is secured to the lamp body with the elastic engaging piece 40 and the retaining screws 47 (FIG. 1). Hence, in the headlamp of the invention, unlike the conventional headlamp, it is unnecessary to use an adhesive to secure the extension to the lamp body 10, and the extension can be firmly secured to the lamp body 10. The operations of securing the extension to the lamp body and removing it therefrom can be achieved with ease. Since no adhesive is used to connect the extension 36 to the lamp body 10, the extension 36 is maintained stably secured to the lamp body 10 for long periods, and the headlamp is free from the difficultly of fouling the lamp body with the adhesive.

The extension 36 is temporarily secured when the elastic engaging piece 40 is engaged with the engaging member 43. Thereafter, the locking portion 40*a* is engaged with the locking recess 45 (FIG. 2(*a*)), so that the extension 36 is prevented from coming off the lamp body 10.

In the above-described embodiment, the technical concept of the invention is applied to the extension 36 of the fog lamp unit 14; however, the invention is not limited thereto or thereby. That is, it goes without saying that the technical concept of the invention is applicable to a projector type headlamp.

As described above, in the motor vehicle headlamp of the invention in which the extension has the elastic engaging piece and the screw mounting pieces, the elastic engaging piece is fixedly engaged with the engaging member formed in the inner surface of the lamp body, and the screw mounting pieces are fixedly secured to fixing portions formed in the inner surface of the lamp body with screws. Hence, the extension can be readily secured to or removed form the lamp body. Furthermore, the extension can be secured to the lamp body more stably and firmly than in the case where adhesive is used to connect the extension to the lamp body. Since no adhesive is employed, the headlamp is free from the difficulty of the extension coming off the lamp body due to deterioration of the adhesive over time. In addition, the employment of the elastic engaging piece contributes to a reduction in the number of fixing screws, and accordingly the extension can be connected to or disconnected from the lamp body with high efficiency.

What is claimed is:

1. A motor vehicle headlamp comprising: a lamp body; a front lens covering the front opening of said lamp body, an engaging member and a plurality of screw fixing portions being formed in an inner surface of said lamp body; an elliptical mirror arranged inside said lamp body; a light bulb surrounded by said elliptical mirror; and a condenser lens whose focal point is set substantially at the second focal point of said elliptical mirror; and an extension placed around said condenser lens, said extension comprising an elastic engaging piece and a plurality of screw mounting pieces, said elastic engaging piece being fixedly engaged with said engaging ember, and said screw mounting pieces being fixedly secured to said screw fixing portions with screws.

2. The headlamp of claim 1, wherein said extension comprises an extension body and a cylindrical member.

3. The headlamp of claim 2, wherein said extension body comprises an upper plate, a lower plate, a pair of right and left side plates, and a rear plate curved forwardly and having a circular hole formed in its center.

4. The headlamp of claim 3, wherein said elastic engaging piece extends rearward from a middle portion of said upper plate.

5. The headlamp of claim 3, wherein said lower plate comprises a pair of right and left screw mounting pieces extending downward therefrom.

6. The headlamp of claim 3, wherein a rear end portion of said elastic engaging piece is formed into a locking portion.

7. The headlamp of claim 6, wherein said locking portion is L-shaped in cross section.

8. The headlamp of claim 6, wherein said locking portion is bent upwards.

9. The headlamp of claim 2, wherein said cylindrical member comprises a conical body having a front opening smaller in diameter than a rear opening thereof, and a conical cover portion for covering peripheral portions of said lens.

10. The headlamp of claim 9, wherein said conical cover portion is formed as a radially inward forward extension of said front opening, thereby to form a lens inserting hole for said condenser lens.

11. The headlamp of claim 1, wherein said engaging member is formed on an inner surface of an upper wall of said lamp body.

12. The headlamp of claim 11, wherein said engaging member comprises a pair of right and left bent pieces L-shaped in cross section formed on an inner surface of said upper wall and confronting one another.

13. The headlamp of claim 11, wherein said engaging member comprises a pair of right and left places.

14. The headlamp of claim 1, wherein said screw fixing portions are formed on an inner surface of a lower wall of said lamp body.

15. The headlamp of claim 2, wherein said extension body comprises a rectangular front opening formed therein and a circular hole formed in a rear end portion thereof substantially a the center of said extension body, and said cylindrical member is inserted into said circular hole from the rear, said cylindrical member being secured to said extension body with screws.

* * * * *